Sept. 17, 1946.　　　C. B. SPASE　　　2,407,728

FRICTION CLUTCH

Filed Jan. 8, 1944　　　2 Sheets-Sheet 1

INVENTOR.
Charles B Spase
BY
Bodell & Thompson
atty's

Sept. 17, 1946.  C. B. SPASE  2,407,728
FRICTION CLUTCH
Filed Jan. 8, 1944  2 Sheets-Sheet 2

INVENTOR.
Charles B Spase
BY
Bodell & Thompson
atty's

Patented Sept. 17, 1946

2,407,728

UNITED STATES PATENT OFFICE 2,407,728

FRICTION CLUTCH

Charles B. Spase, Nedrow, N. Y., assignor to Lipe-Rollway Corporation, Syracuse, N. Y., a corporation of New York Application January 8, 1944, Serial No. 517,557

5 Claims. (Cl. 192—68)

This invention relates to clutches of the type used in motor vehicles between the engines and the transmission gearing. It has for its object a construction by which the pressure ring, back plate and clutch levers may be assembled without the use of pins, pivots and the like, or may be assembled and disassembled merely by a relative rectilinear movement of the pressure ring and the levers in the same direction as, but greater than, the operating movement of the pressure ring, the construction embodying means for coacting with the levers with a ratcheting action during the assembling operation. As the operating movement of the pressure ring is axial to engage and disengage the clutch and this movement is a relatively small one, the relative rectilinear movement of the pressure ring and the clutch levers to assemble or disassemble them is a movement greater than the operating movement of the levers.

The invention further has for its object a simple arrangement of the anti-rattling springs for the levers and an arrangement by which the springs also provide fulcrums for the levers and also by which the springs support the levers from the back plate.

The invention consists in the novel features and in the combinations and constructions hereinafter set forth and claimed.

In describing this invention, reference is had to the accompanying drawings, in which like characters designate corresponding parts in all the views.

Figure 1:
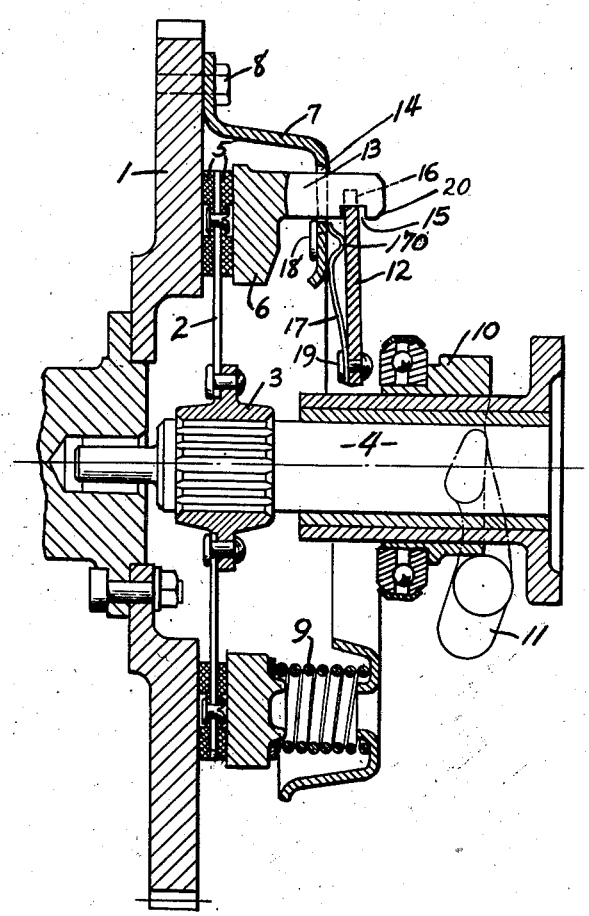
Figure 1 is a sectional view of this clutch and contiguous portions.
Figure 2:
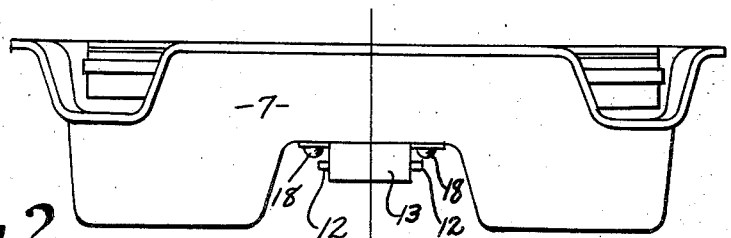
Figure 2 is an edge view of parts seen in Figure 3.
Figure 3:
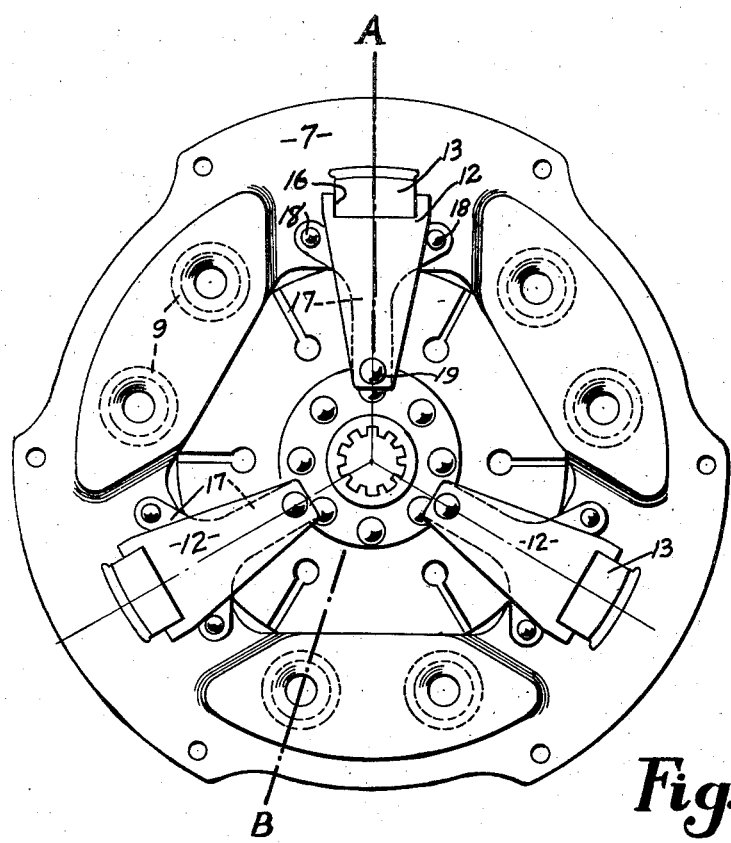
Figure 3 is an elevation looking to the left in Figure 1.

This invention comprises a pressure ring, back plate and clutch lever assembly by which the pressure ring may be assembled with the back plate and clutch levers by a movement axially to a greater extent than is required to engage and disengage the clutch, the pressure ring having means for coacting with the levers with a latching action during the assembling operation, in order that the levers may be interlocked with the pressure ring to coact therewith after the latching operation.

1 designates the driving member of the clutch, which may be the engine fly wheel. 2 is the driven member or plate having a hub 3 slidably splined on the clutch shaft 4 and having friction faces 5 on opposite sides of its outer margin for pressing against the face on the driving member 1 and coacting with the pressure ring 6.

7 designates a back plate or cover, preferably formed of sheet metal, this being secured as by screws 8 to the driving member 1. 9 are clutch springs interposed between the back plate and the pressure ring 6 to engage the clutch or thrust the pressure ring 6 toward the driving member 1 and hold the clutch plate 2 in frictional engagement with the driving member 1. The pressure ring 6 is rotatable with the driving member 1 and is here shown as interlocked with the back plate to rotate therewith by the projections or arms which are in latching engagement with the clutch levers.

10 is the throw-out collar slidable on the clutch shaft 4 and operable in any suitable manner by a clutch pedal or other lever through a throw-out yoke 11. 12 designates clutch levers interposed between the throw-out collar 10 and the pressure ring 6 operable to transmit the throw-out movement of the collar 10 to disengage the clutch or withdraw the pressure ring 6 against the action of the spring 9. As here shown, the pressure ring 6 is provided with rearwardly extending projections or arms 13 extending through openings 14 in the back plate to the rear side thereof, each of these arms being provided with a notch 15 therein for receiving an end surface of the lever 12. As here shown, the levers 12 are formed with wide notches at 16 at their outer ends, the wide notches forming a fork, which is arranged astride the projections with the bottom of the notch 15 in the arm in the notch 16 and engaging the bottom of the notch 16. The levers are supported from the back plate 7 by anti-rattling springs 17, here shown as T-shaped in general outline and secured at 18 at the ends of the head of the T formation to the back plate and at their inner ends at the lower end of the leg of the T at 19 to the inner ends of the levers 12. When the levers are thus assembled, the pressure plate may be assembled with the back plate and the levers by moving the pressure ring 6 rearwardly or to the right through the back plate with the arm or projections 13 extending through the openings 14. The springs 17 are shown as formed with corrugations at 170 which provide yielding fulcrums for the levers 12. During this movement, cam or ratcheting surfaces 20 on the rear ends of said arms engage the ends of the levers, causing the levers to have a ratcheting engagement, until the levers seat in the notches 15, when the pressure ring can be again drawn forward or pressed forward against the action of the anti-rattling spring 17. The pressure ring may be removed by the reverse of this operation. The anti-rattling springs are formed at their upper ends to provide fulcrums for the levers 12.

The anti-rattling springs 17, it will be noted, act in the same direction to engage the clutch as the springs 9 and do not oppose the springs. It will be noted that the notch 15 is wider than the portion of the lever seated therein. As the clutch springs 9 hold the clutch engaged, or in other words, as the levers 12 perform no function when the clutch is engaged but function only during the throwing out operation of the clutch, the wide notches 15 permit idle play of the levers without transmitting throw-out motion, with drivers who are inclined to keep their foot on or press gently on the throw-out pedal or ride the pedal, after the spaces between the throw-out bearing and the inner ends of the levers are taken up by this pedal riding operation. Also, the springs being shaped to form fulcrums as at 170 for the levers 12, provide yielding fulcrums which yield and cushion the springs 9 at the beginning of the clutch engagement when the driver releases the clutch pedal and permits the throw-out sleeve 10 to withdraw quickly from the inner ends of the levers 12. This restriction of the action of the springs 9 is permitted by the wide notches. During the throwing out operation, the lost motion or lash caused by the wide notches is taken up after the throw-out bearing contacts the inner ends of the levers 12, so that thereafter the throw-out pressure is unrestricted by the resilient fulcrums.

What I claim is:

1. In a clutch construction, driving and driven members, a back plate mounted on and rotatable with the driving member and having openings therein, a pressure ring rotatable with the driving member and operable to engage and disengage the clutch, the pressure ring having arms slidable through the openings in the back plate, said arms being formed with notches in their inner sides toward the axis of the clutch and located outside of the back plate and also having ratcheting surfaces at their outer ends, a throw-out collar, spring means for thrusting the pressure ring against the driven member to engage the clutch, clutch levers between the throw-out collar and the pressure ring, the levers interlocking in the notches of said arms, and means for resiliently supporting the levers from the back plate and holding the levers interlocked in the notches and also providing fulcrums for the levers to the inward of said arms with respect to the axis of the clutch, the levers being arranged to coact with said ratcheting surfaces at the outer ends of said arms during the assembling movement of the arms into said notches, said lever supporting means biasing the levers radially outward during ratcheting action and pivotal movements of the levers into and out of said notches.

2. In a clutch construction, driving and driven members, a back plate mounted on and rotatable with the driving member and having openings therein, a pressure ring rotatable with the driving member and operable to engage and disengage the clutch, the pressure ring having arms slidable through the openings in the back plate, said arms being formed with notches in their inner sides toward the axis of the clutch and located outside of the back plate, a throw-out collar, spring means for thrusting the pressure ring against the driven member to engage the clutch, clutch levers between the throw-out collar and the pressure ring, the levers interlocking in the notches of said arms, and leaf springs secured to the back plate and to the inner ends of the levers.

3. In a clutch construction, driving and driven members, a back plate mounted on and rotatable with the driving member and having openings therein, a pressure ring rotatable with the driving member and operable to engage and disengage the clutch, the pressure ring having arms slidable through the openings in the back plate, said arms being formed with notches in their inner sides toward the axis of the clutch and located outside of the back plate, a throw-out collar, spring means for thrusting the pressure ring against the driven member to engage the clutch, clutch levers between the throw-out collar and the pressure ring, the levers interlocking in the notches of said arms, and leaf springs secured to the back plate and to the inner ends of the levers, each spring being formed with a fulcrum for the companion lever.

4. In a clutch construction, driving and driven members, a back plate mounted on and rotatable with the driving member and having openings therein, a pressure ring rotatable with the driving member and operable to engage and disengage the clutch, the pressure ring having arms slidable through the openings in the back plate, said arms being formed with notches in their inner sides toward the axis of the clutch and located outside of the back plate, a throw-out collar, spring means for thrusting the pressure ring against the driven member to engage the clutch, clutch levers between the throw-out collar and the pressure ring, the levers interlocking in the notches of said arms, and springs for supporting the levers from the back plate, each of said springs being T-shaped in general form with the leg of the T secured to the inner ends of the levers and the ends of the head of the T secured to the back plate.

5. In a clutch construction, driving and driven members, a back plate mounted on and rotatable with the driving member and having openings therein, a pressure ring rotatable with the driving member and operable to engage and disengage the clutch, the pressure ring having arms slidable through the openings in the back plate, said arms being formed with notches in their inner sides toward the axis of the clutch and located outside of the back plate, a throw-out collar, spring means for thrusting the pressure ring against the driven member to engage the clutch, clutch levers between the throw-out collar and the pressure ring, the levers interlocking in the notches of said arms, and springs for supporting the levers from the back plate, each of said springs being T-shaped in general form with the leg of the T secured to the inner ends of the companion lever and the ends of the head of the T secured to the back plate, the intermediate portion of the head of the T formation being shaped to form a fulcrum for the lever.

CHARLES B. SPASE.